Jan. 10, 1956 J. A. MERRITT 2,730,079
OIL BURNING WATER HEATER
Filed Oct. 1, 1951 2 Sheets-Sheet 1
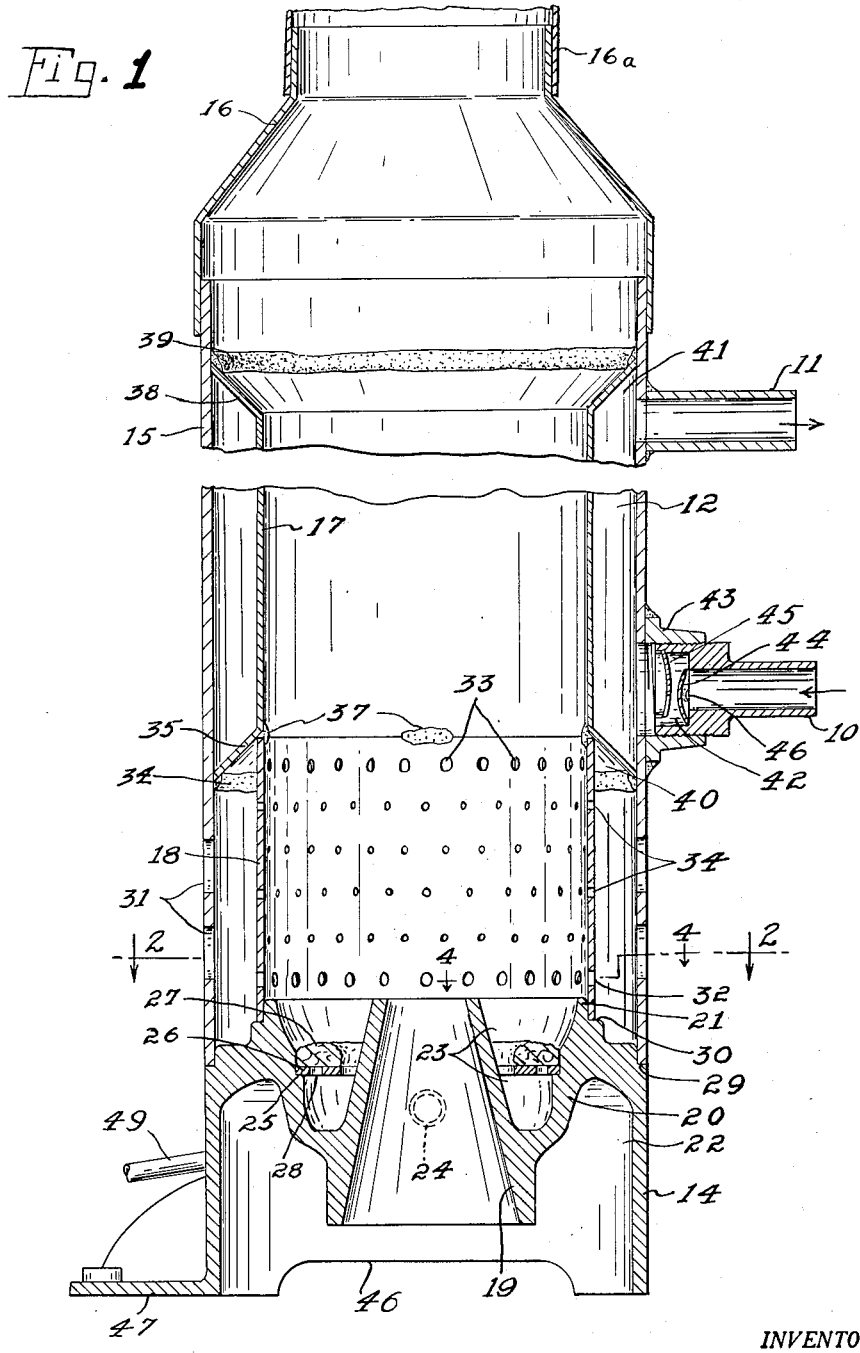
INVENTOR.
Jack A. Merritt
BY Greek Wells
Atty.

Jan. 10, 1956  J. A. MERRITT  2,730,079
OIL BURNING WATER HEATER
Filed Oct. 1, 1951  2 Sheets-Sheet 2
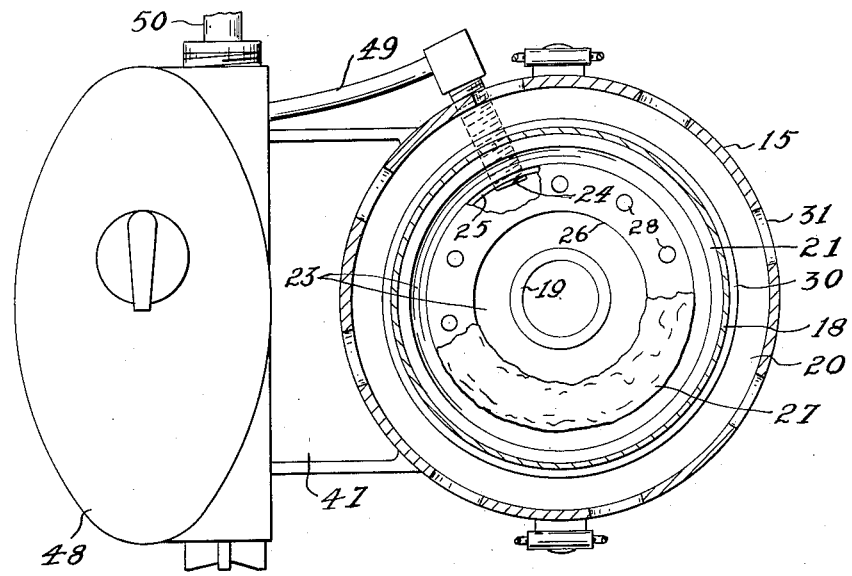
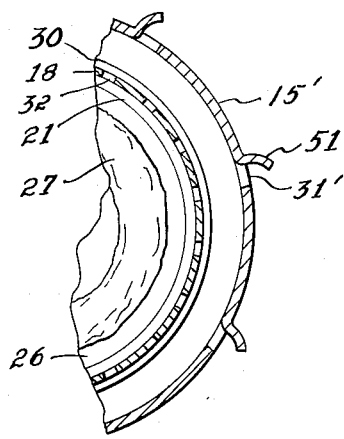
INVENTOR.
Jack A. Merritt
BY Greek Wells
Atty.

United States Patent Office 2,730,079
Patented Jan. 10, 1956

2,730,079

OIL BURNING WATER HEATER

Jack A. Merritt, Spokane, Wash., assignor to Universal Engine Heater Company, Spokane, Wash., a corporation of Washington Application October 1, 1951, Serial No. 249,177

3 Claims. (Cl. 122—156)

My invention relates to improvements in an oil burning water heater that is adapted to burn the heavy oils that are commonly used as fuel for diesel type internal combustion engines.

My invention is particularly useful in connection with vehicles such as tractors and trucks that use diesel engines for motive power. When such vehicles are used in extreme cold, much difficulty can be avoided if the coolant liquid for the engine can be kept moderately warm when the engine is not in operation. The vehicles often have to stand out over night in below zero temperatures where there is no accessible outside source of heat to keep the engine warm.

Heaters for the coolant liquid of engines have been available for many years. However, prior to my invention no heater, capable of using the diesel engine fuel oil, has been found sufficiently reliable to find favor with operators of diesel engine powered vehicles under the circumstances mentioned above. A major cause of the failure of such heaters which have been tried, has been their inability to operate under the variable weather conditions encountered, without producing so much soot and carbon that they clog up. The heater must be capable of running many hours, without attention, in wind and storm, and it must supply heat in adequate quantity to keep the coolant liquid at a temperature to enable the engine to start without trouble.

It is the purpose of my invention to provide a heater for the water or other coolant liquid of an internal combustion engine of the diesel type that will use the same fuel oil as the engine itself, and, that will operate under all low temperature weather conditions the vehicle may encounter without sooting up or going out, the heater consisting solely of a burner, a tubular heat exchange structure over the burner where the hot gases from the burner may give up heat to the coolant liquid of the engine and means to supply fuel oil in adequate quantity to the burner.

It is my belief that the failure of prior heaters to properly burn the heavy fuel oils used for diesel engines has been due to inadequate automatic control of the contact of air and fuel. This results in the bringing of unconsumed fuel particles into contact with surfaces that cool them too suddenly or into contact with air having a temperature too far below the burning temperature of the fuel. These soot deposit forming conditions may exist due to either too little or too much air, but primarily they are due to improper contact of the air with the fuel.

My invention contemplates the provision of a burner having a hollow base that is formed with a top wall which provides an annular well that holds a substantial quantity of the liquid fuel. The base has means to support a wick in the well at a predetermined level below the top of the well. The supply of fuel to the well is controlled by a float operated valve so as to prevent the fuel from rising over and flooding the wick. The base has a central cone shaped sleeve that forms the inner wall of the fuel well. The top wall of the base has an annular rib spaced outwardly from the top of said sleeve and at about the same level. The top wall extends downwardly and inwardly from the rib to join the sleeve and form the outer and bottom walls of the fuel well. The sleeve is extended below the bottom of the fuel well and cooperates with the outer wall of the base to form an annular air pocket beneath the fuel well.

The burner has a superstructure resting on the top wall of the hollow base, that cooperates with the cone shaped sleeve to control the air supply. This superstructure comprises an outer jacket and an inner shell apertured to admit air over the annular rib. This superstructure is essential to effect proper distribution of the air to the burner in all conditions of weather, to prevent sudden blasts of air across the burner and to keep the unburned fuel from depositing in the heater.

The nature and advantages of my invention will appear more fully from the following description and the accompanying drawings wherein a preferred embodiment of the invention is shown. It should be understood that the drawings and description are illustrative only and are not intended to limit the invention except insofar as it is limited by the claims.

In the drawings:

Figure 1 is a vertical sectional view taken centrally through the heater with the liquid fuel supplying unit removed;

Figure 2 is a plan sectional view taken on the line 2—2 of Figure 1; and

Figure 3 is a fragmentary sectional view taken substantially on the line 4—4 of Figure 1 and illustrating a slightly modified construction.

Referring now in detail to the drawings, my invention is embodied in a heater which is constructed and adapted to be mounted adjacent to an internal combustion engine so that the coolant liquid from the engine may be connected by suitable conduits to an inlet nipple 10 and an outlet nipple 11 that are vertically spaced apart and communicate with a heat chamber 12 of the heater. The heater comprises an annular hollow base 14, a jacket 15 mounted on the base and forming the outer wall of the water chamber 12, a discharge stack 16 for the exhaust gases, an inner liner 17 for the water chamber and an inner apertured shell 18 that extends from the base 14 up to the water chamber 12.

The base 14 has an integral central sleeve 19 which is connected to the outer portion of the base by a top wall 20. The top wall 20 meets the sleeve 19 at a point about one third the distance up from the bottom of the sleeve 19 to the top thereof. The top wall extends outwardly and upwardly from the sleeve 19 and has an upstanding annular rib 21. From the rib 21 the top wall extends downwardly and outwardly. This construction leaves an annular pocket 22 within the base 14 around the sleeve 19. The sleeve 19 is conical in shape, gradually decreasing in cross section from its lower end to its top end, the top end of the sleeve being substantially on the same level as the rib 21. The sleeve 19 and the top wall 20 thus form a fuel oil receiving well 23 into which the fuel oil can be supplied through an inlet 24. A wick supporting ledge 26 is set in the wall 23 on a shoulder 25 that is provided in the top wall 20. A wick 27 consisting of an annular loose body of asbestos fibers is supported on the ledge 26. The ledge 26 is apertured as indicated at 28 so that the fuel oil supplied can reach the wick readily.

The jacket 15 rests on the top wall 20, a shoulder 29 being provided for this purpose on the top wall. The inner shell 19 also rests on a shoulder 30 of the top wall 20 and is directly in contact with the outer face of the rib 21. The jacket 15 has a plurality of apertures 31 therein at spaced points around the circumference thereof, there being two annular rows of the apertures 31, one above the other.

The shell 18 has a bottom row 32 of apertures just above the rib 21 and a top row 33 of apertures just below the junction of the shell 18 with the inner lining 17 of the water chamber. A plurality of much smaller apertures is provided between the rows 32 and 33 as shown at 34 in Figure 2 of the drawings.

It will be noted that the inner lining wall 17 of the water chamber is flared outwardly at its lower end as indicated at 35 and is welded at 36 to the jacket 15. The shell 18 is welded to the liner 17 at spaced points as indicated at 37. At the upper end the liner 17 is flared outwardly as indicated at 38 and is welded at 39 to the jacket 15. This construction creates a small pocket at 40 above the apertures 33 in the shell 18. It also creates a small pocket 41 in the water chamber 12 above the outlet nipple 11.

When the water in the chamber 12 is heated by burning fuel, it will rise and will tend to flow out the nipple 11. The inlet nipple 10 has a valve chamber 42 therein and is threaded into a boss 43 in the jacket 15. The valve chamber has a loose cup shaped valve 44 set over the inlet opening of the nipple 10. The valve 44 is held against tipping too far or falling out by a spider plate 45.

The valve 44 prevents back circulation of the water from the chamber 12 in the event of undue resistance to the flow of the liquid outwardly through the nipple 11. The valve 44 does not seat solidly over the inlet opening of the nipple 10 but it has small portions 46 at three spaced points around its periphery where the edge rests so as to prevent solid sealing. This construction is particularly useful in the event the coolant liquid is of a type that becomes viscous or jelly-like when it gets too cool. Under such circumstances the heating of the liquid in the chamber 12 will cause some of the liquid to contact the more viscous coolant liquid in the inlet nipple 10 by leakage past the valve 44. Then as this liquid is heated up it gives up a certain amount of its entrained gases and air to the space 44. Pressure builds up in the chamber 12, compressing this gas and closing the valve 44 until such time as the pressure in the chamber 12 is high enough to force liquid out through the nipple 11 and into the coolant liquid system of the engine. When the liquid flows out through the nipple 11, the pressure of the gas in the pocket 41 forces more of the liquid out through the nipple 11 and occasionally some of the gas escapes through the nipple 11. The drop in pressure in the chamber 12 will cause the valve 44 to open, admitting a rush of coolant liquid to the chamber 12. The lower temperature of the coolant liquid entering the chamber 12, causes the temperature in the chamber to drop, thus reducing the pressure of the gas in the pocket 41 and allowing more liquid to enter past the valve 44. The liquid then warms up and expands until the back pressure is sufficient to close the valve 44 again. Thereafter added heat from the burner causes the process to repeat itself so that there is a continuous pulsating flow of the coolant liquid through the chamber 12.

The greatest difficulty with heaters of this character has heretofore been due to their inability to operate without excessive carbon and soot deposits when they burn the heavy hydro-carbon fuels that are used for diesel engines. My improved construction has withstood the rigid tests of field operations through the winter 1950–51 in the Northwestern United States and Canada without failure. The construction is such that adequate air is supplied for burning the fuel and, except for the initial starting, the fuel to be burned is volatilized in the oil well 23 above the ledge 26 and then receives air which is already raised in temperature to such a degree that it burns the fuel oil without the formation of soot. I attribute this clean burning in part to the cooperation of the central sleeve 19 with the top wall 20 and the hollow base 14 in initially heating the air that enters through the sleeve 19, so as to create a strong draft upward through the center of the heater. The annular pocket 22 serves to heat a certain amount of the air and this air, to escape, must flow down around the lower edge of the sleeve 19 and will then naturally follow the tapered, inner surface of the sleeve getting increasingly hot as it approaches the upper end of the sleeve. The fuel raising just inside the rib 21 is also initially contacted by air that must enter through the apertures 32 in the shell 18. It will be noted that these apertures are lower than the apertuers 31 in the jacket 15. Air entering through the apertures 31 is naturally cooler than the air in the space between the jacket 15 and the shell 18 so the air will initially tend to travel down the jacket 15 and as it picks up heat will travel up the surface of the sleeve 18 to the apertures 32. The smaller openings 34 are of the order of one-sixteenth inch diameter. They admit but a small portion of air at any point and this air is to a substantial degree preheated because it has to rise along the shell 18. By the time the air entering through the openings 31 reaches the openings 33, it is warmed up substantially and the total amount of air entering through the openings 33 is adequate under all circumstances to burn any unburned fuel that has risen to this level. Thus there is an excess of air within the water chamber so that there is substantially no chance for the unburned fuel to strike the water chamber liner 17 and deposit there as soot.

The hollow base 14 has its lower edge recessed as indicated at 46 so that air may enter when the device is set on a solid base. The base 14 has a ledge 47 integral therewith for mounting a float control unit 48 which operates to maintain the level of the fuel oil in the oil chamber 23 at the proper height. A conduit 49 leads from the float chamber 48 to the inlet 24. Fuel is supplied to the float chamber from a suitable source through a conduit 50. The float chamber unit 48 is a well known device. Its function is to maintain the fuel level in the chamber 23 at the wick 27.

The modified construction illustrated in Figure 3 consists of providing louvers 51 over openings 31' in the jacket 15'. The remainder of the construction is not changed. I have found that these louvers do tend to cause the air between the jacket 15' and the inner shell 18 to swirl and this gives a little smoother feeding of the air through the shell 18 when the wind conditions are bad.

It is customary to provide the heater with a stack 16a that extends upward far enough to produce a good draft. The heater is started by turning on the oil so as to fill the well 23 up to the wick 27. The float control device 48 limits the flow of oil so that it is impossible to flood the wick 27. The operator ignites the fuel oil initially by dropping a lighted match into the heater from the top. As soon as the oil is ignited it will begin to heat up the top of the cone shaped sleeve 19 and the top wall at the rib 21. It is to be noted that the wick 27 and its supporting plate 25 are set a substantial distance down into the fuel well 23. I have found this to be an essential feature in the operation of the heater. The burning of the fuel in the well 23 tends to draw air up through the sleeve 19 and this tendency increases as the temperature of the parts 19, 20 and 21 rises. The central stream of air flowing upwardly from the sleeve 19 creates a Venturic tube action to draw air inward across the top of the well 23. This air is drawn into the shell 18 through the openings 32. By observing the burner in operation it is seen that the flame over the wick extends upwardly from the wick to meet the air entering through the apertures 32 and the flame has a characteristic light blue color.

The products of combustion rising from the flame zone, where the air through the openings 32 meets the vapors from the wick 27, are swept upwardly through the center of the heater by the concentrated stream of air that flows through the cone shaped sleeve 19. I find that it is essential to provide enough air inlet area through the openings 32 for complete combustion. The openings 32 have to be relatively small so that wind conditions on the outside of the heater cannot cause sudden blasts of air over the well 23 and disturb the action of the burner. In practice I find that placing the openings 32 about one-half inch apart and limiting their size to approximately one-eighth inch diameter gives adequate air inlet area and prevents wind blasts from disturbing the operation of the burner.

The top wall 20 of the hollow base 14 and the sleeve 19 are heated somewhat by the burning of the fuel and they in turn heat the fuel in the well 23 so as to aid in vaporizing it. It is remembered however, that the heating of the base 14 and of the shell 18 is so slight that even the shell 18 doesn't get red hot. The base 14 may be touched by the hand without burning even after the device has been in operation for hours. I attribute this to the fact that the tremendous volume of air drawn in through the sleeve 19 maintains a condition within the heater that draws the air for combustion through the shell 18 at a rate sufficient to keep the shell from overheating. The shell 18 is in heat exchange engagement with the inner wall 17 of the water chamber 12 and this aids in maintaining the upper portion of the shell 18 at a temperature that will not destroy it. It is to be noted that the interior of the shell 18 is unobstructed and the hot products of combustion can rise freely. By observing the operation of the device it can be seen that the air above the well 23 tends to swirl within the shell 18 without the necessity of any provision being made to direct it circumferentially of the shell. This is no doubt due to unevenness of air flowing from outside and disturbances that create a slightly unbalanced condition of air pressure within the shell 18. The swirling action can be enhanced by provision of the louvers 51 but they are not necessary for the successful operation of the device.

It is believed that the nature and advantages of my invention will be clear from the foregoing description. Having thus described my invention, I claim:

1. A liquid fuel burner adapted for burning Diesel engine fuel and the like comprising in combination an annular hollow base, an inner central air inlet sleeve spaced from said hollow base, a top wall connecting the top of the base with the sleeve, said wall joining the sleeve intermediate the ends of the sleeve and extending outwardly and upwardly from the sleeve and cooperating with the upper portion of the sleeve to form an annular oil well, the top wall having an annular upstanding top rib projecting above the portions of the top wall that lie outwardly of the rib and spaced inwardly from the base and outwardly from the top of the sleeve and providing an outer rim for the oil well, said sleeve tapering inwardly and upwardly from its junction with the top wall and providing an inner rim for the oil well, an inner apertured shell seated on the top wall at said top rib, an outer annular jacket spaced outwardly from the inner shell and seated on the top wall, the jacket having air apertures at spaced points around it and the inner shell having annular rows of small apertures above the rim of the oil well, a wick ledge in said oil well above the bottom thereof and spaced below said rim, an annular wick on the ledge, and means to feed oil into the oil well below said ledge.

2. In a liquid fuel burner adapted for burning Diesel engine fuel oil and the like, comprising an annular hollow base, an inner central frusto-conical air inlet sleeve spaced inwardly from the annular base, a top wall connecting the top of the annular base with the sleeve, said wall joining the sleeve intermediate the ends of the sleeve, and the lower end of the sleeve being spaced above the lower end of the base whereby to form an annular air pocket around the sleeve within the base, the top wall having an annular upstanding top rib projecting above the portions of the top wall that lie outwardly of the rib and spaced inwardly from the base and outwardly from the top of the sleeve, the top surface of the top wall extending downwardly and inwardly from the rib to the sleeve to form the outer wall of an annular oil well, the sleeve forming the inner wall of said well, a wick ledge in said oil well spaced below said rim, an annular wick on the ledge and a fuel oil inlet to the well below said ledge.

3. A water heater adapted for burning Diesel engine fuel and the like comprising in combination an annular hollow base, an inner central air inlet sleeve spaced from said hollow base, a top wall connecting the top of the base with the sleeve, said wall joining the sleeve intermediate the ends of the sleeve and extending outwardly and upwardly from the sleeve and cooperating with the upper portion of the sleeve to form an annular oil well, the top wall having an annular upstanding top rib projecting above the portions of the top wall that lie outwardly of the rib and spaced inwardly from the base and outwardly from the top of the sleeve and providing an outer rim for the oil well, said sleeve extending inwardly and upwardly from its junction with the top wall and providing an inner rim for the oil well, an inner apertured shell seated on the top wall at said top rib, an outer annular jacket spaced outwardly from the inner shell and seated on the top wall, an imperforate shell joined to said inner shell and extending upwardly therefrom, partition walls extending outwardly from the upper and lower ends of the imperforate shell to the jacket to form therewith a water chamber, the inner wall of which is in direct heat conducting relation to the apertured shell, the jacket having air apertures at spaced points around it and the inner shell having annular rows of small apertures above the rim of the oil well, the lowermost row being below the lowermost apertures in the jacket, an oil inlet in the top wall adjacent to the bottom of the oil well, and a wick in said well above the inlet.

References Cited in the file of this patent

UNITED STATES PATENTS

| | | |
|---|---|---|
| 179,431 | Tower | July 4, 1876 |
| 2,125,966 | Sweatt | Aug. 9, 1938 |
| 2,348,760 | Stamm | May 16, 1944 |
| 2,416,546 | Resek | Feb. 25, 1947 |
| 2,420,981 | Rivers | May 20, 1947 |
| 2,470,699 | Hayter et al. | May 17, 1949 |